(12) United States Patent
Hill (10) Patent No.: US 7,097,734 B2
(45) Date of Patent: Aug. 29, 2006

(54) SYSTEM AND METHOD FOR FORMING WOOD PRODUCTS

(76) Inventor: David A. Hill, 2868 NW. Polarstar, Bend, OR (US) 97701

( * ) Notice: Subject to any disclaimer, the term of this patent is extended or adjusted under 35 U.S.C. 154(b) by 78 days.

(21) Appl. No.: 10/150,544

(22) Filed: May 16, 2002

(65) Prior Publication Data
US 2002/0189753 A1 Dec. 19, 2002

Related U.S. Application Data

(60) Provisional application No. 60/291,733, filed on May 16, 2001.

(51) Int. Cl.
*B32B 31/20* (2006.01)
*C08G 14/04* (2006.01)

(52) U.S. Cl. .................. 156/335; 528/129
(58) Field of Classification Search ........ 156/314, 156/335
See application file for complete search history.

(56) References Cited

U.S. PATENT DOCUMENTS

| | | | |
|---|---|---|---|
| 3,326,844 A | 6/1967 | Gruber | |
| 3,374,987 A * | 3/1968 | Joyce et al. | 366/262 |
| 3,947,425 A * | 3/1976 | Freeman et al. | 528/127 |
| 3,963,546 A | 6/1976 | Roberti | |
| 4,028,310 A | 6/1977 | Schafer et al. | |
| 4,366,918 A * | 1/1983 | Naka | 222/134 |
| 4,493,286 A * | 1/1985 | Carson | 118/677 |
| 4,595,445 A | 6/1986 | Hombach et al. | |
| 4,663,201 A | 5/1987 | House et al. | |
| 4,798,862 A | 1/1989 | Gillis, Jr. | |
| 4,983,643 A | 1/1991 | Sanna, Jr. | |
| 5,013,813 A | 5/1991 | Zimmerman et al. | |
| 5,104,930 A | 4/1992 | Rinde et al. | |
| 5,124,426 A | 6/1992 | Primeaux, II et al. | |
| 5,126,173 A * | 6/1992 | Machenaud | 427/426 |
| 5,218,005 A | 6/1993 | Zimmerman et al. | |
| 5,225,118 A | 7/1993 | Juang et al. | |
| 5,317,076 A | 5/1994 | Primeaux, II | |
| 5,384,385 A | 1/1995 | Trinks et al. | |
| 5,388,761 A * | 2/1995 | Langeman | 239/1 |
| 5,442,034 A | 8/1995 | Primeaux, II | |
| 5,496,911 A | 3/1996 | Smith | |
| 5,504,181 A | 4/1996 | Primeaux, II | |
| 5,580,945 A | 12/1996 | Wade et al. | |
| 5,626,705 A * | 5/1997 | Winterowd et al. | 156/304.5 |
| 5,731,397 A | 3/1998 | Primeaux, II et al. | |
| 5,759,695 A | 6/1998 | Primeaux, II | |
| 5,810,254 A * | 9/1998 | Kropfield | 239/61 |
| 5,944,938 A | 8/1999 | Winterowd et al. | |

OTHER PUBLICATIONS

"Chemical Resistance Testing for Polyurea Spray Elastomers," *Huntsman Industry Article*, Date Unknown (3 pages total).
Permax Roofing & Insulation Systems brochure, Resin Technology Co., Date Unknown (4 pages total).
Permax 700 HP, RTC Elastomeric Coating and Polyurea Coatings, Technical Information, Date Unknown (3 pages total).
Material Safety Data Sheet, Resin Technology Company, May 13, 1993.
"A Study of Polyurea Spray Elastomer Systems," *Huntsman Industry Article*, Reprint, *High Solids Coatings*, vol. 15, 1994, pp. 1-8.

* cited by examiner

*Primary Examiner*—Sam Chuan Yao
(74) *Attorney, Agent, or Firm*—Kolisch Hartwell, P.C.

(57) ABSTRACT

Methods for securing wood members together are disclosed. The methods include the use of an adhesive that quickly cures without heating. Adhesives may be impingement sprayed or splattered onto a contact surface. The methods may be used to form high-strength bonds between wood and/or plastic members in short processing times.

7 Claims, 4 Drawing Sheets

SYSTEM AND METHOD FOR FORMING WOOD PRODUCTS

CROSS-REFERENCE TO RELATED APPLICATION

This application claims the priority under 35 U.S.C. §119 and applicable foreign and international law of U.S. Provisional Patent Application Ser. No. 60/291,733 filed May 16, 2001 which is hereby incorporated by reference in its entirety.

FIELD OF THE INVENTION

The present invention relates generally to wood processing methods, and more particularly to systems and methods of bonding wood members together.

BACKGROUND

In woodworking applications, it is often necessary to bond wood pieces together to produce a wood product. For example, recent environmental regulations and depletion of old-growth timber supplies have made it increasingly difficult and expensive for manufacturers to obtain high-grade lumber to use in wood products, which may include furniture, cabinets and millwork. One way of addressing the shortage and high cost of high quality lumber is the use of veneered stock. Typically, veneered wood products are created by laminating high quality veneer over a lower grade core material, such as medium density fiberboard (MDF), particle board, plywood or finger-jointed stock. Use of veneered wood members results in a substantially more efficient utilization of high quality wood, and therefore reduces raw material costs. Other examples of wood products produced by joining wood members together include door and window jambs, plywood, laminated veneer lumber, and other laminated wood products.

Wood used in construction varies significantly in moisture content. An elevated moisture content of wood members may add time and cost to a lamination process. Recently-harvested timber may have a moisture content of 50–60% or higher, which may be further increased by transport of the timber along a waterway, or storage of processed lumber in a wet environment. Prior lamination methods frequently require a kiln-drying step prior to bonding to remove excess water, even from green dimensional lumber which typically has a moisture content of about 18%. After kiln drying, wood has a moisture content of about 12%, providing a relatively reproducible surface environment for bonding. However, the drying step prior to lamination introduces a significant additional cost and increases the processing time.

For most woodworking applications, a wood bond must be strong in order to provide structural strength and stability. For example, it is often desirable to form a "high-strength wood bond" that has a shear-strength exceeding the shear-strength of the wood itself. Generally, high strength wood bonding procedures require application of an adhesive to a wood surface, and subsequent pressing of the wood surface against another wood surface or against a polymeric material such as PVC, polyethylene, polystyrene, polypropylene, phenolic paper and wood fiber composites with any one of the above-listed polymers.

One significant limitation with prior wood bonding techniques is that the procedure required to produce a high-strength wood bond may take a long time, for example, several hours, to produce a cured product.

Other procedures can be performed more rapidly by using an adhesive that is activated to some extent during the pressing process. For example, adhesives may be activated by applying heat. These adhesives are referred to as "thermoset adhesives."

Presses may use heating platens or radio frequency mechanisms to activate and speed up significantly the cure time of a thermoset adhesive. Presses with heat activation mechanisms are somewhat complex, and expensive. These presses may also be limited in their ability to achieve uniform curing in some composite configurations.

Another way of activating an adhesive during pressing is to use a two-part adhesive system in which the two parts are substantially separate and unmixed until the pressing step, sometimes referred to as a "honeymooning" process. For example, see U.S. Pat. Nos. 5,944,938 and 5,626,705. However, a problem with this approach is that the pressing step may not adequately or reproducibly mix the two adhesive parts, thereby creating an inferior or inconsistent bond, or causing delays in the curing process. Another problem with a honeymooning process is that it is difficult to control the actual ratio of mixed adhesive components due to variable penetration or dilution of the components into the wood prior to mixing, particularly where the moisture content of the wood is variable.

There is a need for universal simplified wood bonding systems and procedures that can produce a rapidly-curing, high-strength wood bond between different types of wood pieces having a wide range of possible moisture contents, and between wood and polymeric materials such as vinyl, without requiring complicated adhesive activation steps while the wood pieces are being pressed.

SUMMARY OF THE INVENTION

The invention provides improved wood products and manufacturing systems involving plural wood members and/or polymer materials adhesively bonded together by a rapidly-curing adhesive. The invention further includes systems and methods of forming a composite wood product by using a multi-component adhesive to bond wood pieces together rapidly without requiring a preparatory drying operation or a subsequent heating step to cure the adhesive.

Many other features of the present invention will be realized by those versed in the art upon reading the detailed description which follows and the accompanying sheets of drawings in which preferred embodiments incorporating the principles of this invention are disclosed as illustrative examples.

DETAILED DESCRIPTION

Figures 1, 2, 3:
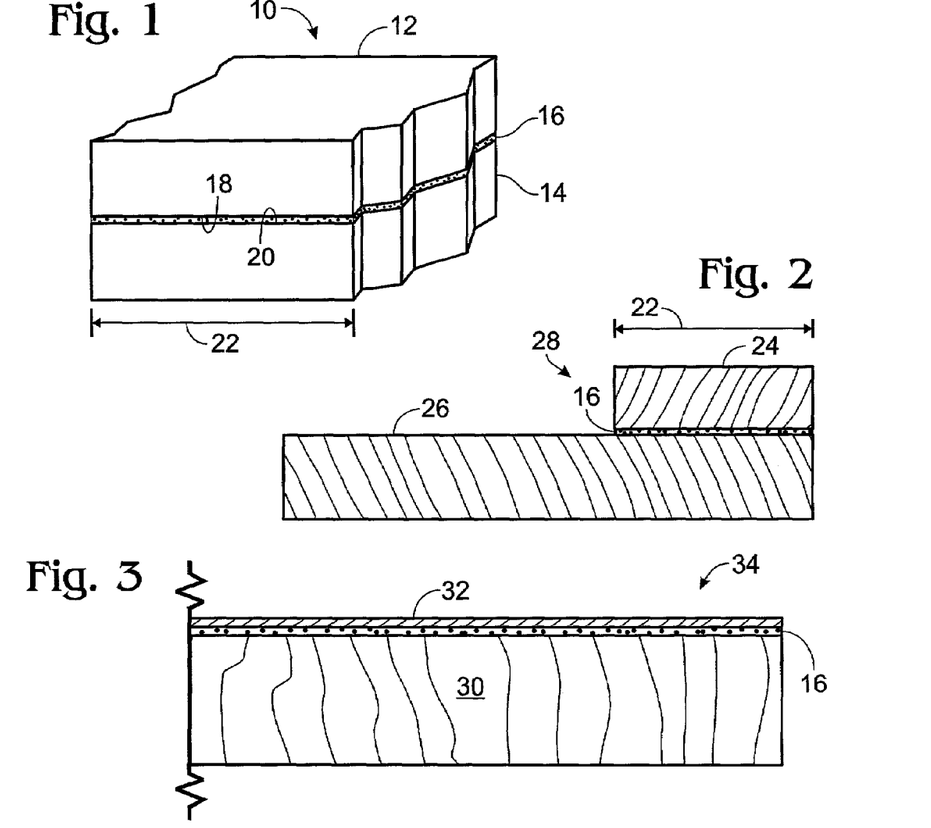
FIG. 1 is a partial isometric view of a wood product constructed according to the present invention.
FIG. 2 is a cross-sectional view of another wood product made according to the present invention.
FIG. 3 is a cross-sectional view of another wood product made according to the present invention.

A wood product constructed according to the present invention is shown in FIG. 1 and indicated generally at 10. Product 10 includes wood members 12 and 14, which are adhered together by an adhesive 16. As used herein, the term "wood" includes all known wood-based and cellulosic materials, including lumber, processed wood products, particle board, fiberboard, finger-jointed stock, cellulosic materials, and paper.

In FIG. 1, members 12 and 14 generally represent any wood member falling within the scope of the above definition. Each member 12 and 14 includes a contact surface 18 and 20, respectively, that face each other in a generally opposed relationship and define a region of overlap, which is generally indicated at 22. It is within the scope of the present invention that wood members 12 and 14 may vary in composition, size and shape, and may include, for example, components of window and door frames, layers of wood, processed wood, unfinished wood, finished wood, etc. For example, in FIG. 2, adhesive 16 extends between the opposed contact surfaces in the region of overlap to secure together wood members 24 and 26 to form wood product 28, which in FIG. 2 is a door frame. In FIG. 3, wood member 30 is a core, and wood member 32 is veneer, which is secured to core 30 by adhesive 16 to form a veneered product 34.

In FIGS. 1–3, one surface of each member is adhesively joined to a corresponding contact surface of another member, however, a single wood member may have multiple wood members secured to one or more of its surfaces by adhesive 16. For example, in FIG. 4 a central core 36 is adhesively secured to four wood members 38, 40, 42, and 44 by adhesive 16. Core 36 includes plural contact surfaces 48, 50, 52 and 54, which are each adhesively secured to a corresponding contact surface 56, 58, 60 and 62 on wood members 38, 40, 42, and 44, respectively. Typically, core 36 is a lower grade wood material, such as MDF, finger-jointed wood or low-grade lumber, and wood members 38, 40, 42, and 44 are veneer. As shown, product 46 is shaped to be a window sill, although the particular shape and configuration of core 36 and its contact surfaces may vary. Alternatively, one wood member may be wrapped around one or more contact surfaces of another wood member, such as disclosed in copending patent application Ser. No. 09/189,917, which is entitled "System for Applying a Wood Veneer Across a Corner of an Elongate Core" and the disclosure of which is hereby incorporated by reference.

Figures 4, 5:
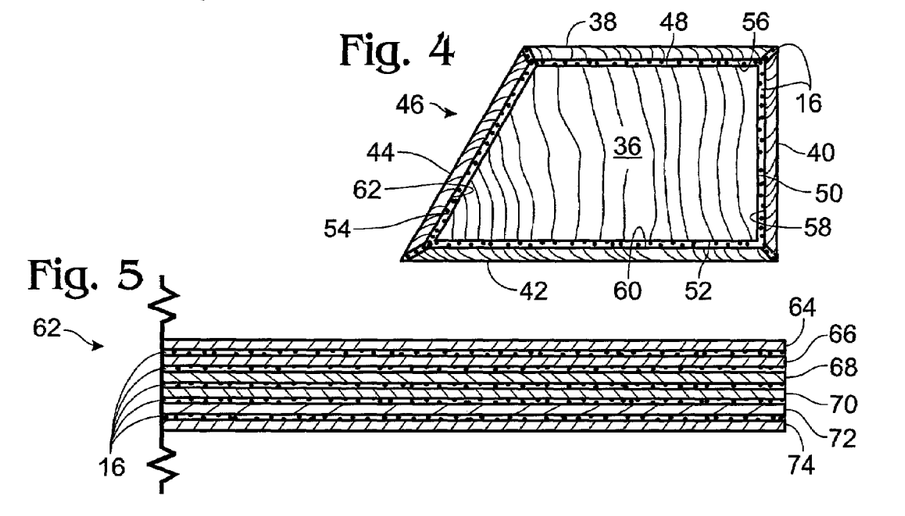
FIG. 4 is a cross-sectional view of another wood product made according to the present invention.
FIG. 5 is a cross-sectional view of another wood product made according to the present invention.

In FIG. 5, a wood product 62, also referred to as a wood assembly, is shown with a multiplicity of wood members 64, 66, 68, 70, 72 and 74 forming multiple overlapping layers that are adhesively secured together by plural layers of adhesive 16 to form a composite that generally resembles plywood. In FIG. 5, six wood members are shown, although the number and compositions of the wood members may vary and still be within the scope of the present invention.

It should be understood that the examples of wood products discussed above and illustrated in FIGS. 1–5 are intended to provide illustrative, non-limiting examples of wood products that are within the scope of the present invention and which may be produced by the invented system and method. Also, the thickness of adhesive 16 has been exaggerated in the Figures for purposes of illustration.

Unlike thermoset adhesives that require a heating step to fully activate the adhesive during the curing period, adhesive 16 is formulated to cure rapidly upon mixing of two or more adhesive components without being heated. Two adhesive components, hereafter referred to generically as component A and component B, have a much longer pot-life, typically more than one hour, when maintained separately, prior to mixing. In contrast, when components A and B are mixed they gel rapidly at room temperature to a polymerized state, for example, in less than about five minutes.

In some embodiments of the invention, component A may comprise an empirically-determined mixture of two commercially available components, referred to hereafter as A1 and A2. Components A1 and A2 each are separately capable of producing an activated adhesive when mixed with component B, based on substantially similar polymerization chemistries, but with distinct gel times. For example, an adhesive produced in accordance with the invention may comprise a mixture of components A1, A2, and B that produces a gel time distinct from, and typically intermediate between, adhesives from mixtures of A1 and B, or A2 and B.

An adhesive produced by mixture of components A and B according to the invention can be described as having a gel time and a cure time. The gel time of an adhesive is defined as the period of time in which the A+B mixture, in a vessel, achieves a breakable, semi-solid state at 21° C. Some activated adhesives (A+B), such as the resorcinol adhesives described in Example 1 below, frequently exhibit exothermic behavior upon mixing. Therefore, to test their gel time they are cooled to below 21° C. before mixing to eliminate the effect of heat released upon mixing.

In contrast to the laboratory environment of the gel time measurement, the cure time is measured as a function of the wood bonding method of the invention. The cure time is the elapsed time between 1) adhesive mixing and 2) the point at which the bond between wood members is strong enough to allow handling of the wood assembly without detectable separation of wood members.

The gel time described above is distinct from the cure time measured for joined pieces of wood. Specifically, other factors such as the temperature of the wood member surfaces to be bonded, the temperature of the activated adhesive solution, and the moisture content of the wood members may contribute to the overall rate of curing. Therefore, the cure time is a reflection of the ambient and conditions present at the time of forming the wood assembly. The cure time may be optimized by adjusting the ratio of A1 and A2 components to achieve minimal processing time and maximal bond strength. Generally, the cure time may be, for example, about five-fold longer than the gel time, although this difference may range from less than 2-fold to greater than 25-fold depending on the conditions.

The moisture content of the wood to which the adhesive is applied may play an important role in the rate of curing and the strength of the wood assembly bonds that are achieved. Not only does the moisture content sometimes affect the rate of curing, but it may determine the relationship between the bond strength and the curing time. Specifically, the wood moisture content may help determine the amount of adhesive that cures at the set line at the interface between the joined wood members versus the amount that is absorbed into the wood. Wet wood has the ability to rapidly absorb adhesive, thus a shorter cure time may provide a stronger bond between wood members. It will be appreciated that the range of gel times provided by the invention are suitable to compensate for changes in adhesive absorption. Furthermore, the range of gel times provided by the invention and the ability to adjust the adhesive gel time, allow a fairly constant cure time to be achieved under a variety of wood moisture contents, inherent wood characteristics, and environmental conditions.

The adhesive compositions used according to the invention are considered "fastgelling" and "fast-curing." A fast-gelling adhesive typically has a gel time of less than about two minutes. A fast-curing adhesive is characterized typically by a cure time of less than about ten minutes, and preferably in less than about five minutes.

After adhesive application, wood members are pressed together, either manually or preferably using a pressing device. Whatever the pressing method used, the wood assembly is cold-pressed as the adhesive cures. In cold-pressing, no heat is applied to the wood or adhesive through an external source after the adhesive is applied, such as by heating the wood members through conduction or radio frequency heating. Instead, a cold-pressed wood assembly produced by the present invention relies on fast-gelling, fast-curing adhesives.

Figure 6:
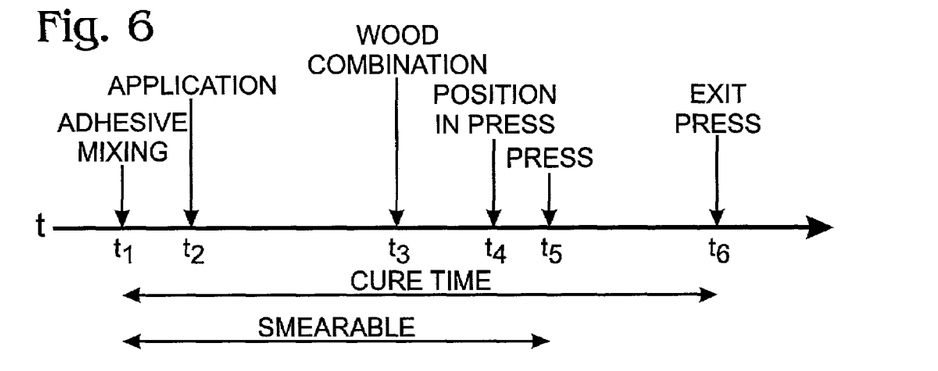
FIG. 6 is a timeline showing various events in a preferred method of embodiment of the invention.

Because the mixed, activated adhesive 16 used according to the invention is fast-curing when cold-pressed, the components of adhesive 16 are maintained separate from each other until just prior to application on a wood member. Typically, this involves mixing the components just prior to applying them onto the wood surface. This application technique is shown in FIG. 6. Suitable two-component applicators in which the reactants are not mixed until just prior to application are manufactured by the Gusmer Corp. of Lakewood, N.J.

Figure 7:
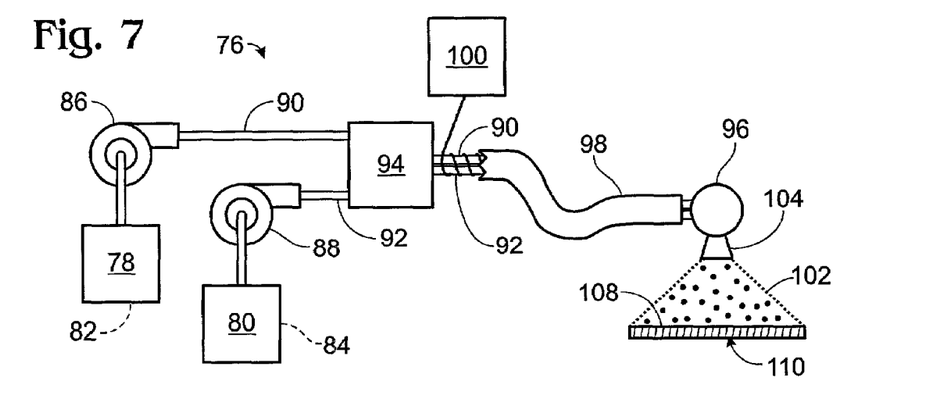
FIG. 7 is a schematic view of a system for producing the wood products shown in FIGS. 1–5.

Instead of mixing the components of adhesive 16 just prior to application, another alternative is to spray the components onto the desired contact surface so that mixing does not occur until after the components are dispensed from the applicator. The spray streams may be oriented to mix in the air, or to create generally parallel streams that are mixed on the contact surface. An illustrative example of this application technique is shown in FIG. 7 and will be discussed in more detail below.

It should be understood that other methods for applying the components of adhesive 16 exist and are within the scope of the present invention. When a spray applicator is used, the applicator may be manually positioned, or it may be mounted in a defined position on an automated apparatus for producing wood products. In such an automated apparatus, wood members typically are moved on conveyors past one or more applicators. Whatever the application method used, it is important to efficiently and thoroughly mix adhesive components A and B to activate the adhesive before joining the surfaces of the wood members and pressing them together.

Because the activated adhesive systems of the present invention are fast-curing, care also must be taken that the adhesive does not gel or cure substantially before a second wood member is pressed against the applied adhesive to adhesively bond the contact surfaces together. This may be done either manually, or the process may be automated with an apparatus that includes conveyors and other assemblies for positioning and contacting wood members together. It is also important to align the wood members properly before substantial curing of the adhesive occurs.

People in the woodworking field may not have expected the feasibility of using a rapid curing, pre-activated adhesive in a cold-press procedure due to stringent timing and precision handling requirements that are inherent to such a system. The present invention preferably uses highly automated precision handling apparatus to coordinate mixing of an appropriate adhesive system, application of the mixture, assembly of the wood pieces, transport, and pressing in a smooth rapid operation.

After placing the wood members together, the members should be compressed to retain the members in a selected position until the adhesive cures. This compression step also spreads the adhesive between the contact surfaces and removes any air trapped between the contact surfaces. Although the wood members may be compressed manually, this step is preferably performed with a press, which may include platens or rollers, such as has been used in the past with thermoset adhesives that required heating during the pressing step. Unlike these known compression systems, however, the invented system cold-presses the wood assembly during adhesive curing. No heat is required to cure the adhesive. Therefore, the pressing and curing time interval can be reduced compared to prior methods.

An important objective of the invention is to match the cure time of the adhesive system to the processing and handling time required to properly transport, combine, and press the wood pieces together. The cure time must allow sufficient time to handle the wood prior to pressing, with minimal extra time so that the entire manufacturing process can be performed as rapidly as possible.

A timeline is shown in FIG. 6 illustrating an unscaled temporal sequence of adhesive application, wood handling, pressing, and curing steps. Adhesive components A and B are mixed at $t_1$. The adhesive mixture is applied to the wood surface at $t_2$. Wood pieces are combined at $t_3$. The combined wood pieces are positioned precisely together in press at $t_4$. High pressure is exerted on the composite continuously from $t_5$ to $t_6$.

The cure time in the process shown in FIG. 6 spans from $t_1$ to $t_6$. The adhesive system continues to polymerize and set-up during the entire interval from $t_1$ to $t_6$. Initially after mixing and application, the adhesive is generally fluid, and not particularly tacky or sticky. During this phase the adhesive is "smearable", i.e., may be pushed around by touching the wood surface. It is important that the adhesive remain substantially smearable at least until $t_4$ when the pieces of wood are being precisely positioned relative to each other before applying high pressure. Accordingly, the adhesive system should be optimized along with the wood handling and pressing equipment so that the cure time of the adhesive, $t_1$ to $t_6$, is minimal while allowing the adhesive mixture to be smearable at least until $t_4$.

In FIG. 7, a system for producing wood products according to the present invention is schematically illustrated and generally indicated at 76. System 76 includes supplies 78 and 80, which respectively contain components 82 and 84, which correspond to component A and component B of adhesive 16. Each supply 78 and 80 is in communication with a pump 86 and 88, respectively, which is adapted to deliver feeds 90 and 92 of the components under pressure to a proportioner 94. Proportioner 94 controls, or meters, the flowrate and ratio of each feed 86 and 88, and may also control the temperature and pressure of the feeds. In place of the separate pumps shown in FIG. 7, a dual-head pump may be used to deliver and control the mix ratio of the feeds.

From proportioner 94, feeds 90 and 92 are delivered to an applicator 96. The component feeds are delivered to applicator 96 at an elevated pressure. Optionally, one or both components may be heated somewhat to regulate the viscosity and thus flow properties of components. With the fast-gelling adhesives used in accordance with the invention, heating of the adhesive prior to application is generally not used to accelerate the reaction rate. Instead, the rate of curing is substantially determined by the temperature and moisture conditions at the bonding interface. When temperature control of the components prior to application is elected, the feeds are insulated with a jacket 98 that is heated by a heater 100 to maintain the feeds at a desired temperature. If proportioner 94 also heats the feeds, then the heater 100 may be omitted from the system. Jacket 98 may be retained, however, to prevent heat loss as the feeds are delivered to applicator 96.

In FIG. 7 it can be seen that feeds 90 and 92 are prevented from mixing until they are delivered to applicator 96. Depending upon the particular applicator selected, the feeds may be either mixed within the applicator shortly before being applied, or the feeds may be applied sequentially and thereby mixed by the application process. In FIG. 7, applicator 96 mixes the component streams and dispenses a stream 102 of activated adhesive through outlet 104 and onto contact surface 108 of a wood member 110. Examples of suitable applicators are manufactured by the Gusmer Corporation of Lakewood, N.J. and are known as two-component impingement sprayers.

An alternative embodiment of the applicator of FIG. 7 (not shown) accommodates three-components. Such an applicator is quite similar to the two-component applicator of FIG. 7, except that a third supply and pump are included, and a proportioner is configured to proportion three components. In this embodiment two of the supplies represent distinct A-type components, A1 and A2, and the third is component B. A proportioner is used to regulate the ratios of components A1, A2, and B. This system would allow the operator to easily modify the gel time of the activated adhesive by changing the relative amounts of A1 and A2 to adapt to changing conditions, such as the moisture content of the wood members or ambient wood temperatures.

Another way to control or adjust the cure time of a wood bonding process is to add a predetermined amount of water to one or both of the wood surfaces before applying the adhesive. For some applications, adding water to the wood surface may favorably increase or decrease the cure time, and may also help to strengthen the resulting bond by increasing the depth of adhesive penetration into the wood prior to curing.

Figure 8:
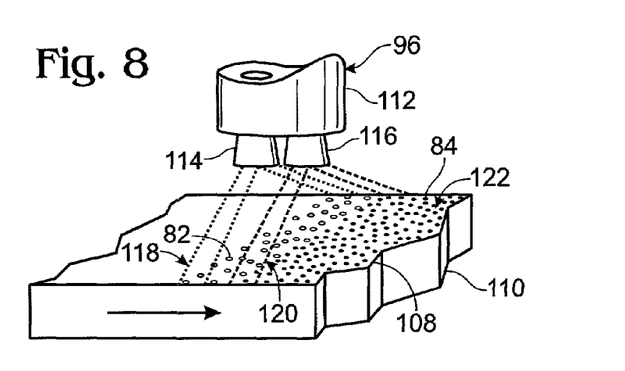
FIG. 8 is an enlarged detail of another embodiment of the applicator of FIG. 6.

In FIG. 8, applicator 96 is shown with an outlet 112 that includes plural orifices 114 and 116, each of which receives a respective one of feeds 90 and 92 and applies the feed to at least one wood member without mixing the feeds until after being dispensed from the outlet. As shown, the orifices cooperate to deliver generally parallel streams 118 and 120 of components 82 and 84. As shown, the streams are applied to a contact surface 108 of wood member 110 as the wood member and outlet are moved with respect to each other. Where the applied streams overlap, components 82 and 84 mix to form fully activated adhesive 122.

Figure 9A:
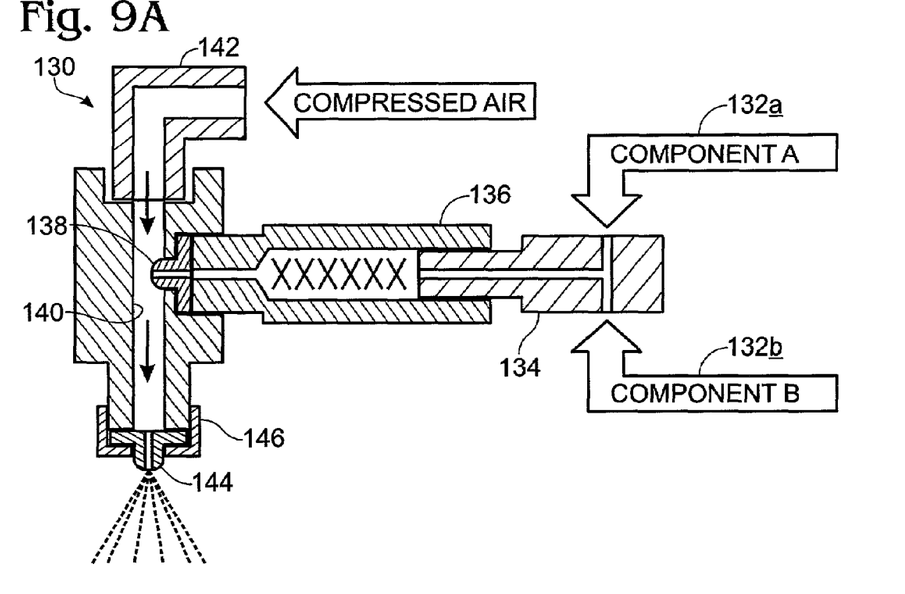
FIG. 9A is a cross-sectional view of another embodiment of the invention for applying adhesive to a wood surface.

FIG. 9A shows an alternative applicator system for mixing and depositing a two-part rapid curing adhesive. The applicator shown in FIG. 9 is particularly advantageous for depositing higher viscosity adhesives such as polyurethane. Polyurethane adhesives may be preferred, for example, to bond wood to other materials such as plastics. Splatter applicator 130 sprays adhesive components 132*a* and 132*b* into a first mixing chamber 134. The adhesive mixture then moves into post-mixing chamber 136 and exits spray tip 138. The adhesive then enters another chamber 140 which has an upper port or valve 142 for receiving compressed air. Compressed air entering port 142 adds adhesive down through chamber 140, through spray tip 144. Spray tip 144 is secured to chamber 140 by lock nut 146. Applicator 130 is particularly useful for depositing higher viscosity adhesive such as polyurethane which would be preferable for rapidly bonding wood to plastic materials. Adhesive applicator 130 may be used to deposit rapid curing adhesives that are more viscous than adhesives deposited by the spray system shown in FIG. 7. For example, an applicator system may be used to splatter applicate adhesives having a viscosity up to at least about 20,000 CPS. Applicator 130 may also be used to apply adhesives having viscosities substantially less than 20,000 CPS.

Figure 9B:
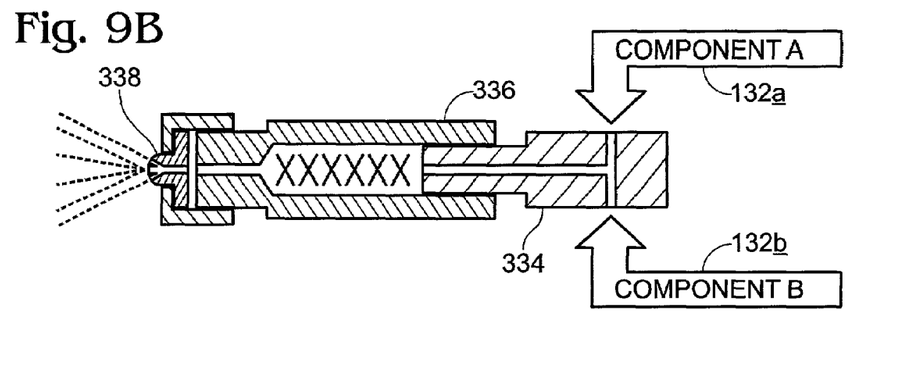
FIG. 9B shows an alternate assembly for depositing rapid-curing adhesive.

FIG. 9B shows an alternative applicator system similar to the one shown in FIG. 9A. Adhesive components 32*a* and 32*b* are channeled into mixing chamber 334. The adhesive mixture then moves into post-mixing chamber 336 and exits extrusion tip 338. Extrusion tip 338 has multiple orifices for depositing mixed adhesive beads in parallel.

After the application step shown in FIGS. 7–9B, one or more wood members are bonded to wood member 110 by aligning their respective contact surfaces in a generally opposed relationship with contact surface 108. The contact surfaces of the respective members face each other and define a region of overlap in which adhesive 16 is sandwiched between the contact surfaces. After the contact surfaces are both in engagement with activated adhesive, the wood members are compressed to urge the members toward each other. As discussed, the two-component adhesive system of the invention is fast-curing when the wood assembly is cold-pressed, so this pressing step may be significantly shorter than the similar step that is required when external heat must be applied to cure the adhesive.

Figure 10:
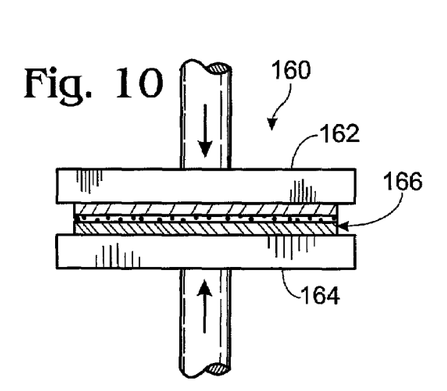
FIG. 10 is a side view of a press including opposing platens for bonding wood pieces together.

The compression step may be performed manually, or it may be automated, in conjunction with a press. In FIG. 10, an example of a suitable press is generally indicated at 160 and includes a pair of platens 162 and 164 that are driven toward each other to compress a wood product 166. The platens are configured to move toward each other to a minimum spacing, which corresponds to the thickness of the finished wood product. It should be understood that wood product 166 may have a shape and configuration of any of the wood products described herein, and that the size and shape of the platens should be selected to correspond with the shape of the wood product to be compressed. The platens may also be larger than the wood products so that multiple wood products may be compressed at one time. Also, the minimum distance between the platens is typically adjustable to accommodate wood products of differing sizes.

Figure 11:
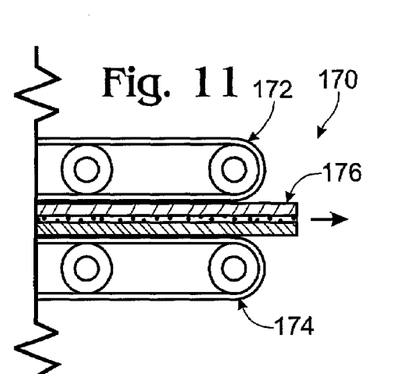
FIG. 11 is a partial side view of a press including a roller assembly.

Another example of a press is shown in FIG. 11 and is generally indicated at 170. Press 170 includes upper and lower roller assemblies 172 and 174 that not only compress wood product 176, but also convey wood product 176 along a feed path while being compressed. This form of press enables wood products to be produced in a continuous process.

It should be understood that presses 160 and 170 would typically be mounted on a frame of an apparatus for producing wood products. For example, a system of conveyors may be used to receive wood products and convey them to an applicator, such as applicator 96, then position other wood members upon the applied adhesive to form a wood product, such as wood product 166. After joining the wood members together, the conveyors then transport the product to a press, such as presses 160 or 170.

Figure 12:
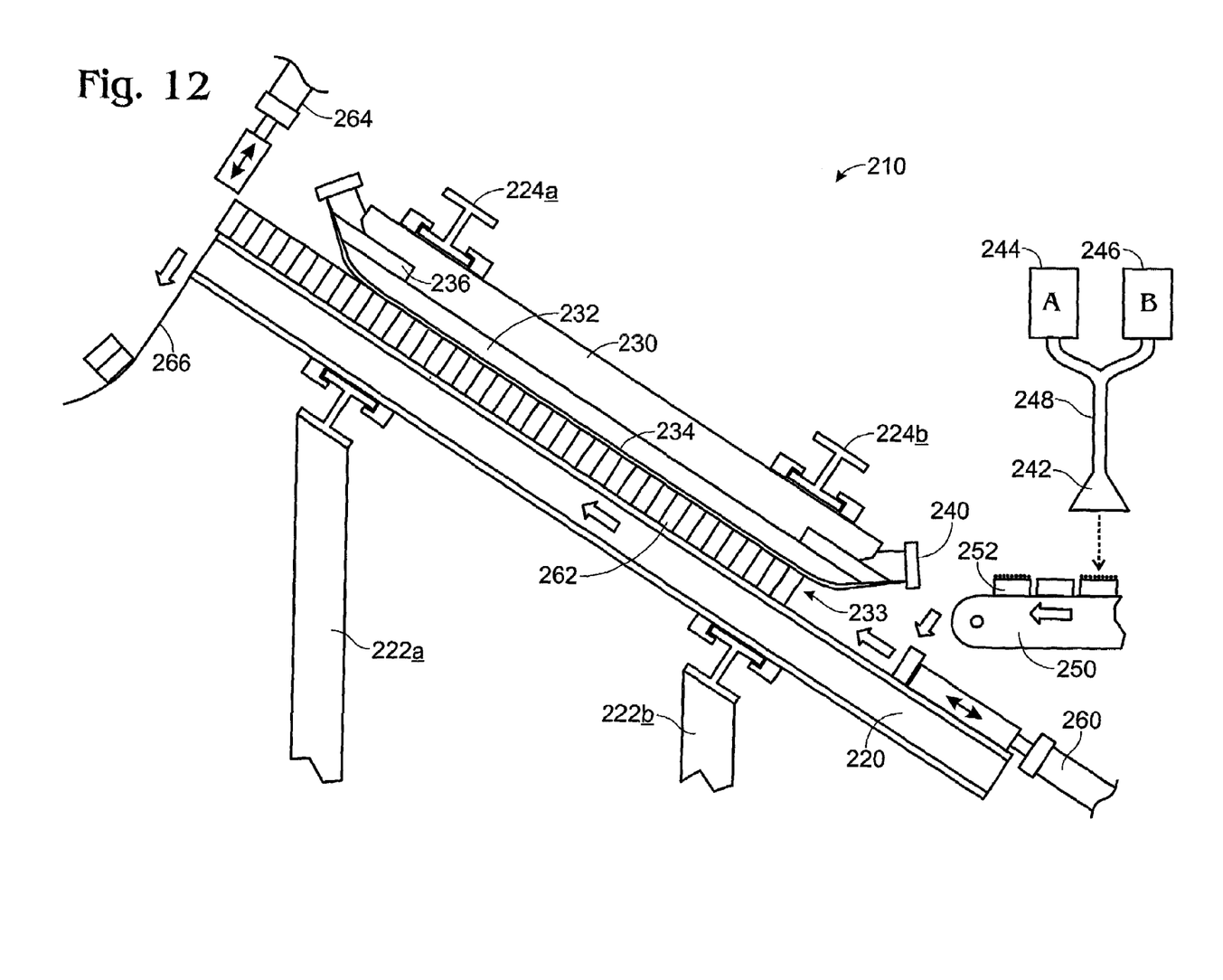
FIG. 12 is a side view of another press designed for use in accordance with the invention.

FIG. 12 shows a system for bonding wet lumber pieces using a friction press, and an impingement spray system. Friction press 210 includes support rail 220 which may be an I-beam structure. Support rail 220 is secured and supported in a diagonal orientation by posts 222a and 222b. On the other side of Friction press 210, support beams 224a and 224b support steel tube 230. Steel tube 230 supports air hose 232 creating an inner passage 233 for receiving and pressing wet lumber pieces. Inner passage 233 is lined from the air hose side by stainless steel band 234 which is held under tension by supports 236. Air caps 240 are provided on the ends of steel tube 230.

An impingement spray device 242 is mounted in a position to deposit adhesive on surfaces of wet lumber pieces prior to entering Friction press 210. In a preferred embodiment, a rapid curing two-part adhesive system such as resorcinol is processed through impingement spray device 242. Two tanks 244 and 246 are provided to contain the two parts of the adhesive system prior to mixing. A conduit system 248 connects tanks 244 and 246 to impingement spray device 242 to provide mixing and delivery of activated adhesive.

Conveyor 250 is positioned to carry wood pieces 252 to the adhesive application station and then to the entrance of inner passage 233 of friction press 210. Hydraulic ram 260 operates to push lumber into friction press 210. In the embodiment shown in FIG. 12, adhesive is applied on every other piece of lumber 252 conveyed by conveyor 250. This results in final composite products having two pieces of lumber bonded together per product. For example, two pieces of 1×4 lumber can be bonded to produce one piece of 2×4 lumber, as shown exiting from friction press 210.

A second hydraulic ram 264 is provided at the output end of friction press 210 to urge bonded products to separate from the pressed stack 262, and proceed down slide 266.

One part of the invention may be thought of as a method for joining wood members together by providing first and second wood members, each having a contact surface, and then applying a mixed two-component, fast-curing adhesive to at least one of the contact surfaces. Applying the adhesive includes applying components that when combined create the adhesive. As described further below, the adhesive may be any suitable two-component resin that is fast-curing when a wood assembly is cold-pressed. Examples presented below include a resorcinol-based adhesive, a polyurethane-based adhesive, or a polyurea-based adhesive. The cure rate of the adhesive may be modified by adding substances to or eliminating them from the adhesive. For example the amount of a reaction catalyst or inhibitor may be adjusted to accelerate or slow down the reaction. This may be carried out using a mixture of components A1 and A2 as described above. The contact surfaces are then positioned so that they generally face each other and define a region of overlap, wherein the adhesive contacts the contact surfaces in the region of overlap and binds the members together. In this method, the adhesive may be applied by impingement spraying, or by splattering according to methods described above.

The following examples describe the use of fast-curing adhesive compositions in cold-press procedures. These adhesive compositions are intended to be illustrative and to exemplify specific compositions suitable for use with the invention.

EXAMPLE 1

Resorcinol-based adhesives have been demonstrated to be effective for bonding wood products together. A line of commercially available two-component resorcinol adhesives is offered by Borden Chemical, Inc. of Springfield, Oreg. These two-component resorcinol-based adhesive compositions are formulated to produce a range of gel times, based on the specific composition selected.

Component A in these compositions is referred to as a CASCOPHEN reagent. Borden Chemical offers distinct CASCOPHEN reagents, that is, related components A, with different gel times when mixed at a ratio of 2:1 (volume:volume) with CASCOSET FM-6310L catalyst, hereafter referred to as CASCOSET. Borden's CASCOSET catalyst includes paraformaldehyde. For example, Borden Chemical provides an ultra fast-gel CASCOPHEN that gels in about 1 second when activated with CASCOSET catalyst. Fast-gel CASCOPHEN, product number WS-662-64, gels in about 5–10 seconds when activated with CASCOSET. In contrast, moderate-gel CASCOPHEN, pmduct number WS-662-55, gels in about one minute when mixed with CASCOSET. According to the invention, ultra fast-gel, fast-gel, and moderate-gel CASCOPHEN products may be mixed in the desired ratio, while maintaining the overall 2:1 ratio of CASCOPHEN product to CASCOSET, to achieve a gel time intermediate between that achieved with single, activated CASCOPHEN reagents.

The ratios of CASCOPHEN reagents described above that are useful in providing a fast cure time according to the invention are as follows: moderate:fast, ratios of 10:0 through 0:10; and fast:ultra-fast, 10:0 through 0:10.

In other embodiments of resorcinol resins used in accordance with the invention, the CASCOPHEN reagent or a related composition from another supplier, may be defined as component B and distinct formulations of the catalyst may function as components A1 and A2.

EXAMPLE 2

Fast-curing polyurethane adhesives were used to bond wood to polymeric materials, for example, PVC. Polyurethane adhesives suitable for use according to the invention are available commercially. These polyurethane adhesives can be rapidly cured in cold-pressed wood assemblies.

Vantico Inc., of East Lansing, Mich., produces a commercially available polyurethane adhesive that is fast-curing when cold-pressed. Component A is LSA 708-93 resin, and component B is LSA 708-95 hardener. They may be used at a ratio of 100:83, which provides a gel time of 30 seconds and a cure time in the range of about 2 to 3 minutes Franklin Adhesives also offers a fast-curing adhesive useful in carrying out the invention. The REACTITE R2032 system may be mixed in a ratio of 4:1, resin:hardener, providing a gel time of about 30 seconds, and a cure time of about 2–3 minutes.

EXAMPLE 3

Some embodiments of the invention use a two-component adhesive that rapidly produces a polyurea resin upon mixing. In these embodiments, polyurea resin is formed by mixing two 100% solids components, namely an isocyanate and an amine-terminated polyether resin, under elevated pressure. The isocyanate component is typically a polyisocyanate, and may be either aromatic- or aliphatic-based. The polyether resin is an amine-terminated polyether resin, such as JEFFAMINE® polyoxyalkylene diamines and triamines and m-TMXDI® amine from the Huntsman Corporation of Salt Lake City, Utah. The resin component may also include various additives, such as pigments, chain extenders and fire retardants. Examples of polyurea resins, the components for making polyurea resins, and preparation and application techniques and equipment are disclosed in U.S. Pat. Nos. 4,028,310, 4,663,201, 4,798,862, 4,983,643, 5,013,813, 5,104,930, 5,124,426, 5,225,118, 5,317,076, 5,442,034, 5,496,911, 5,504,181, 5,580,945, 5,731,397 and 5,759,695, which are hereby incorporated by reference.

A two-component polyurea resin composition that has proven effective for use with the present invention is sold under the trade name PERMAX 700 produced by the Resin Technology Co. of Ontario, Calif. Components A1 and A2 of a polyurea adhesive may be Permax 700HP (high performance) and Permax 700-Slow. Mixtures of Permax 700HP:700-Slow, may be mixed at a ratio between 10:0 to 0:10. The HP:Slow mixture is combined with component B in a 1:1 ratio to activate the adhesive.

One advantage of using polyurea resin as an adhesive is that it is formed in a solvent-free system that is at least substantially, if not completely, free from volatile organic compounds.

EXAMPLE 4

A two-part polyurethane adhesive was used to bond wood to vinyl. The polyurethane adhesive system was obtained from Vantico Inc. of East Lansing, Mich., and included an isocyanate known as ARATHANE AW 8680 as the resin component, and polyol, known as LSA 729-08, as the adhesive hardener. The adhesive was combined and applied through an applicator system such as applicator 130, as shown in FIG. 8.

EXAMPLE 5

Another polyurethane adhesive system was successfully used to bond wood to wood. The two-part adhesive was obtained from Vantico Inc. of East Lansing, Mich. The adhesive system includes resin and hardener components under the name RP 6450. RP 6450 polyurethane adhesive has a relatively low viscosity so it can be applied by spraying, as shown in FIG. 7, or by splattering, as shown in FIG. 9.

EXAMPLE 6

FIG. 13 shows another assembly that can be used to deposit rapid-curing adhesive on the surface of a material. The device shown in FIG. 13 is particularly useful for applying adhesives that have a high viscosity, for example, greater than 3000 CPS. Such high viscosity adhesives may be difficult to atomize through a spray device. The applicator shown in FIG. 13 extrudes plural component rapid-curing adhesives using impingement spraying equipment that has been adapted with multi-orifice extrusions tips. As shown, in FIG. 13, a series of adhesive components A and B are pumped into a mixing chamber, through mixing elements in a post-mixing chamber. The adhesive mixture is then directed through a multi-orifice extrusion tip to produce glue beads on a substrate. To apply adhesive to larger surfaces, a series of applicators, like the one shown in FIG. 13, can be used, connected to common "A" component, and "B" component manifolds.

EXAMPLE 7

It may also be useful to pre-treat a wood surface, with a dilute aqueous adhesive solution prior to applying a two-part activated adhesive mixture, as described in Example 1. In an alternate method of the invention, a dilute aqueous resorcinol solution, for example, five to ten percent of the CASCOPHEN solution of Example 1, is applied to the surface prior to spraying activated CASCOPHEN adhesive, as described in Example 1. The two applications preferably are carried out without drying in between. As explained previously, applying the resorcinol adhesive on a wet surface may improve penetration characteristics in some rapid processing applications.

While the invention has been disclosed in its preferred form, the specific embodiments thereof as disclosed and illustrated herein are not to be considered in a limiting sense as numerous variations are possible. Applicant regards the subject matter of the invention to include all novel and non-obvious combinations and subcombinations of the various elements, features, functions and/or properties disclosed herein. The following claims define certain combinations and subcombinations which are regarded as novel and non-obvious. Other combinations and subcombinations of features, functions, elements and/or properties may be claimed through amendment of the present claims or presentation of new claims in this or a related application.

I claim:

1. A method for joining wood members together, the method comprising selecting an adhesive system including a resorcinol based resin component A and a paraformaldehyde catalyst component B to promote curing, in a manufacturing process that does not use any heating step after mixing to enhance curing, providing the resorcinol based resin component A and the paraformaldehyde catalyst component B in separate containers near an adhesive application station along a conveyor path, positioning an applicator device along the conveyor path, the applicator device having a mixing chamber connected to a tip member having an orifice, the tip member being configured to spray or splatter mixed adhesive onto a contact surface on a first wood member being transported on a conveyor past the adhesive application station, pumping metered proportions of adhesive components A and B from the respective containers, through an adhesive intersection, then through the mixing chamber where the adhesive components are thoroughly mixed into a fully activated adhesive mixture immediately prior to dispensing the fully activated adhesive mixture through the orifice onto the first wood member, wherein the adhesive components are mixed in appropriately a 2:1 volumetric ratio of component A to component B, resin component A being comprised of a mixture of resin components A1 and A2 having different gel and cure times, contacting a contact surface of a second wood member with the contact surface of the first wood member, and cold-pressing the contact surfaces together until the adhesive mixture is cured.

2. The method of claim 1, wherein each of the adhesive components has a viscosity of less than about 3000 CPS at ambient temperature.

3. The method of claim 1, wherein the applicator device sprays the adhesive mixture on to the contact surface of the first wood member.

4. The method of claim 1, wherein the applicator device splatters the adhesive mixture on to the contact surface of the wood member.

5. The method of claim 1, wherein the adhesive components are formulated to have a gel time of less than about two minutes.

6. The method of claim 1, wherein each of the wood members is selected from the group consisting of lumber, fiber board, strand board, particle board, finger joined stock, veneer, and phenolic paper.

7. The method of claim 1, further comprising
controlling the temperature of the adhesive components prior to mixing the components together.

* * * * *